No. 674,378. Patented May 21, 1901.
R. GOOD, Jr.
GLASS PRESSING APPARATUS.
(Application filed Aug. 9, 1900.)
(No Model.)
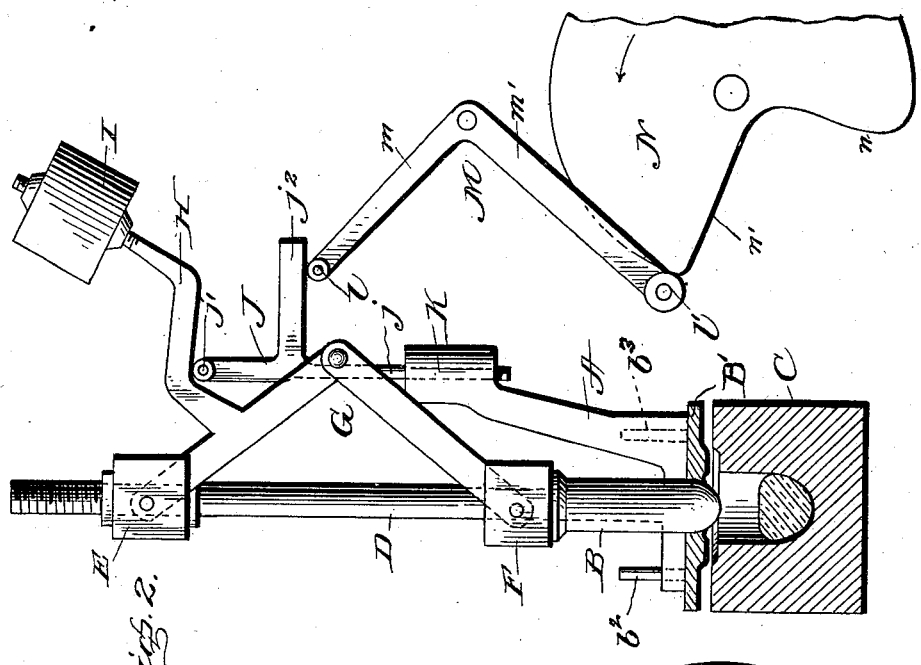
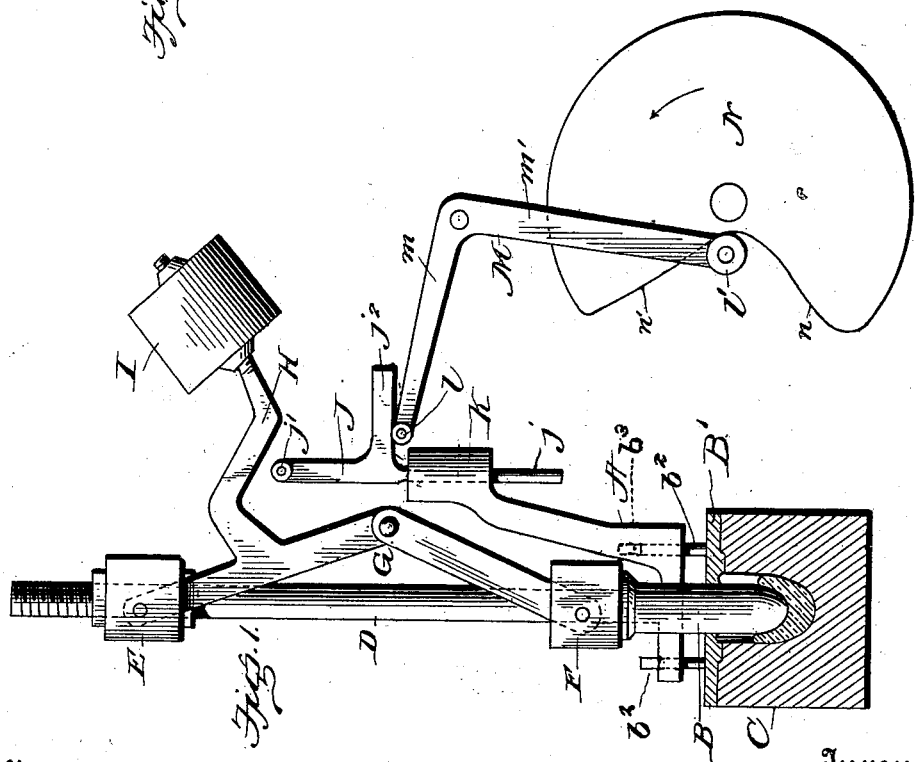
Witnesses
C. E. Hunt
L. O. Farrington
Inventor
Robert Good, Jr.
By Irving Elting
Attorney
THE NORRIS PETERS CO., PHOTO-LITHO., WASHINGTON, D. C.

UNITED STATES PATENT OFFICE.

ROBERT GOOD, JR., OF POUGHKEEPSIE, NEW YORK.

GLASS-PRESSING APPARATUS.

SPECIFICATION forming part of Letters Patent No. 674,378, dated May 21, 1901.

Application filed August 9, 1900. Serial No. 26,424. (No model.)

*To all whom it may concern:*

Be it known that I, ROBERT GOOD, Jr., a citizen of the United States, residing at Poughkeepsie, in the county of Dutchess and State of New York, have invented new and useful Improvements in Glass-Pressing Apparatus, of which the following is a specification.

My invention relates to a glass-pressing apparatus adapted for use in the manufacture of ordinary pressed ware or in connection with bottle and jar blowing machinery.

The object of the invention is to provide a construction of apparatus by means of which the plunger or former which shapes the glass in the mold may be actuated solely by mechanical means, so as to dispense with the use of hand-labor and insure a constant and uniform pressure of the plunger at each working stroke, and thereby cheapen the cost of production and provide for the manufacture of a superior article; also, to provide an apparatus of this character in which the operating mechanism may be adjusted to regulate the pressure on the glass to a nicety and prevent excess pressure.

The invention consists, primarily, of a glass-pressing apparatus embodying a plunger combined with an impelling agent therefor other than the human hand, whose force properly multiplied is communicated to the plunger and the length of whose career or stroke is controlled by the amount of glass charged in the mold, said impelling agent being stopped in its career only when the glass is pressed up and fills the space between the plunger and interior of the mold and resists further downward progress of plunger, thus providing means whereby the length of the stroke of the plunger is controlled by the amount of glass in the mold and excess of pressure on the glass avoided.

The invention further consists of a glass pressing or molding apparatus embodying a plunger, means for elevating said plunger and releasing it, and means for moving said plunger to its work when released by the elevating means, and in certain other novel features of construction, combination, and arrangement of parts, as will be hereinafter more fully described, and particularly pointed out in the appended claims.

In the accompanying drawings, Figure 1 is an elevational view of a glass-pressing apparatus embodying my invention, showing the plunger near the end of its working stroke and in the act of forming an article in a mold, the latter appearing in section. Fig. 2 is a similar view showing the plunger elevated.

A in the drawings represents a portion of the frame of a pressing-machine, B a vertically-movable plunger, C a mold whose inside shape corresponds to that of the outside of vessel to be pressed, B' a cover-plate having guide-pins $b^2$ working in apertures $b^3$ in the frame, D one of the usual pair of parallel guides, E a stationary cross-head adjustably mounted on the upper ends of the guides, F a cross-head slidable on said guides, and G power-multiplying devices consisting of toggle-levers jointed to said cross-heads, all of the ordinary or any preferred construction. In this type of glass-presses it is customary to employ a hand-lever and a counterbalance-weight for maintaining said lever, the plunger, and coöperating parts in their normal elevated positions, the plunger being depressed by hand to shape the glass in the mold. This mode of operating the press by hand-power is uncertain, as it is practically impossible to obtain a uniform pressure on the glass at each stroke of the plunger and to produce a uniform run of perfectly-formed articles unless the operator is highly skilled. My invention is designed to overcome these objections in a simple and effective manner.

In carrying my invention into practice a plunger-impelling device consisting of a weighted arm H is connected to the upper toggle lever or levers and projects upwardly and rearwardly therefrom, so as to drop by gravity and force the meeting ends of the toggle-levers inward, and thereby force the plunger downward on its working stroke. The toggle-levers multiply the force or power of the impelling device to the desired extent. The weight I, carried by the impelling-arm H, is adjustably secured, so as to be shifted on the arm to vary the applied force or pressure. The impelling-arm is normally supported to hold the plunger retracted or elevated by a reciprocating, elevating, and releasing device, comprising a rod or bar J, having a stem *j* mounted to slide within a guide K on the frame and provided with a friction-roller *j'* to bear upon said impelling-arm, and a lateral arm *j²*. Upon the under side of this arm bears a friction-roller *l*, mounted upon the free end of one arm *m* of a bell-crank lever M, the other arm *m'* of which is also provided with a friction-roller *l'* to traverse the working face of a cam N.

The operation is as follows: Assuming that the mold has been charged with glass and the parts are in the position shown in Fig. 2, in which the plunger is represented as being raised out of the mold and the friction-roller *l'* as riding upon the periphery of the cam, the upper arm *m* of the bell-crank lever will be maintained in contact with the lateral arm *j²* of the rod or bar J until the descending portion *n* of the working face of the cam is encountered by said roller *l'*, whereupon the bell-crank lever will be operated to swing the upper arm *m* thereof downward and out of contact with the arm *j²*. The bar J will then drop, allowing the weighted impelling-arm H to descend, the power of which, multiplied by the toggle-levers G, forces the plunger downward into the mold-chamber to press the charge of glass therein into the desired form. When the plunger is stopped in its downward stroke by the resistance of the glass, the movement of the weighted arm ceases and the pressure is applied to the charge of glass proportionately to the leverage exerted by adjusting the weight I. The cam continues to revolve, and when the ascending portion *n'* of the working face thereof comes into contact with the lever the bar J is raised and elevates the impelling-lever, thereby retracting the toggle-levers and raising the plunger for removal of the mold and the substitution of another mold containing a charge of molten glass.

It will thus be seen that the operation of the apparatus is entirely automatic and that by properly adjusting the weight I the requisite degree of pressure and no more may be exerted on the glass, which obviates the objection to the uncertainty and variableness of hand-pressure and insures the rapid production of perfectly-formed articles.

The length of time the glass is to remain under pressure may be readily regulated by timing the cam N. Any suitable construction of power-multiplying mechanism may be employed in place of the toggle-levers shown in the present instance and other changes and modifications made within the spirit and scope of the invention. The power of the plunger-impelling agent is, it will be understood, regulated by adjusting said agent—namely, the weight I—according to the amount of pressure desired to be exerted upon the glass contained in the mold, so as to secure the required pressure in any particular instance.

The invention may be employed in the manufacture of ordinary pressed ware or in connection with bottle and jar blowing machinery.

Having thus fully described my invention, what I claim, and desire to secure by Letters Patent, is—

1. In a press, the combination with a plunger, of means for elevating the plunger and releasing it and a weighted impelling device for moving said plunger to its work, the movement of said impelling device being controlled or arrested when positive resistance is presented to plunger by the material acted upon, said positive resistance to plunger constituting the arresting or controlling agency, substantially as set forth.

2. In a press, the combination with a plunger, of means for elevating the plunger and releasing it, a weighted impelling device for the plunger, whose movement is controlled or arrested by positive resistance to plunger when such resistance is offered by material acted on, and power-multiplying connections between the impelling device and the plunger, substantially as set forth.

3. In a glass molding or pressing machine, the combination with a plunger adapted to coöperate with a molding or pressing machine, of means for elevating said plunger and releasing it, and a weighted impelling device for moving said plunger to its work, said latter means being controlled in its movement by the amount of glass to be pressed, substantially as set forth.

4. In a glass molding or pressing apparatus, the combination with a plunger, of means for elevating the plunger and releasing it, and a weighted impelling device for moving said plunger to its work, the stroke of said impelling device being controlled or arrested by the amount of glass to be pressed, substantially as set forth.

5. In a glass molding or pressing apparatus, the combination with a plunger, of means for elevating the plunger and releasing it, a weighted impelling device for the plunger, whose movement is controlled or arrested by the amount of glass to be pressed, and power-multiplying connections between the impelling device and the plunger, substantially as set forth.

6. In a glass molding or pressing apparatus, the combination with a plunger, of means for elevating the plunger and releasing it, and an arm carrying an adjustable impelling-weight for moving said plunger to its work, said plunger being controlled or arrested in its movement by the amount of glass to be pressed, substantially as set forth.

In testimony whereof I have hereunto set my hand in the presence of two subscribing witnesses.

ROBERT GOOD, Jr.

Witnesses:
IRVING ELTING,
MARTIN HEERMANCE.